Aug. 15, 1944.   F. P. LASSETER   2,355,875
METHOD OF AND APPARATUS FOR CLARIFYING LIQUIDS
Filed April 3, 1942   3 Sheets-Sheet 1

INVENTOR
FRANKLIN P. LASSETER
BY
John E. Hubbell
ATTORNEY

INVENTOR
FRANKLIN P. LASSETER
BY
John E. Hubbell
ATTORNEY

Aug. 15, 1944.  F. P. LASSETER  2,355,875
METHOD OF AND APPARATUS FOR CLARIFYING LIQUIDS
Filed April 3, 1942  3 Sheets-Sheet 3
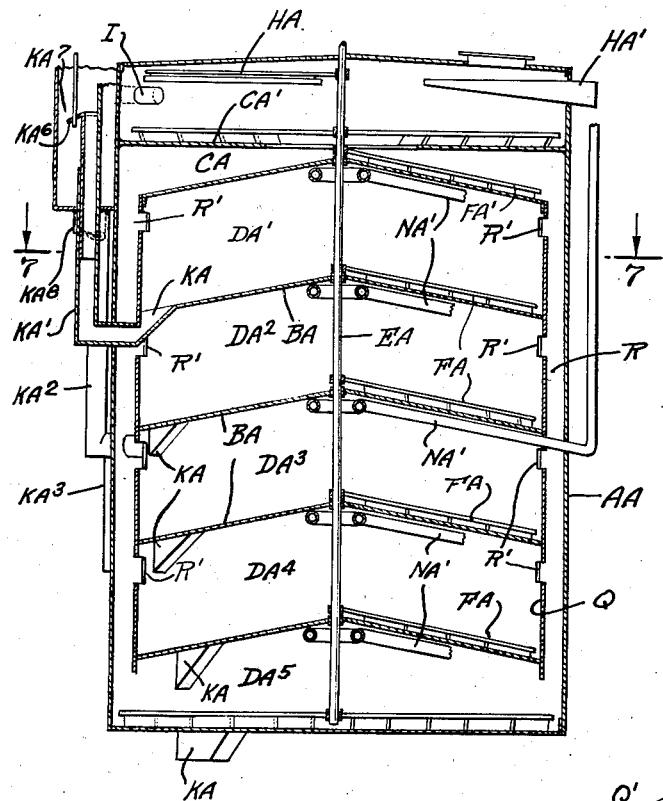
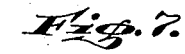
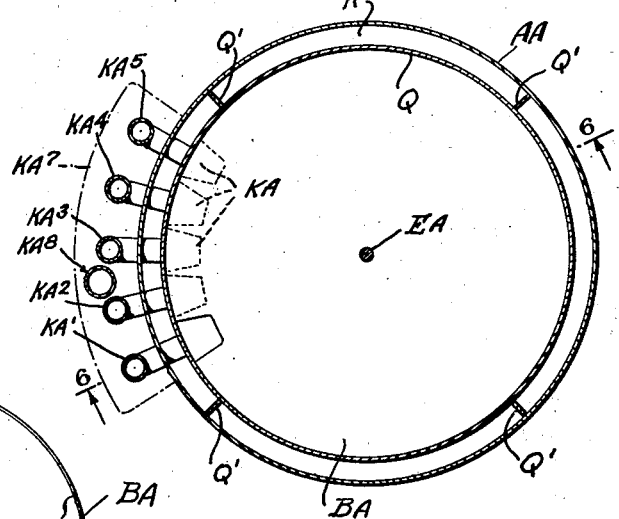
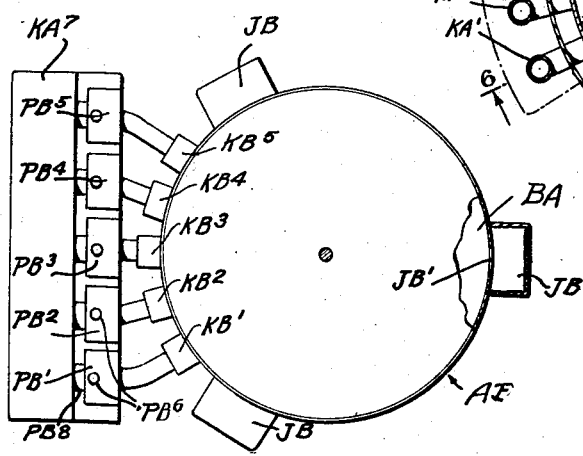
INVENTOR
FRANKLIN P. LASSETER
BY
ATTORNEY Patented Aug. 15, 1944

2,355,875

UNITED STATES PATENT OFFICE 2,355,875

METHOD OF AND APPARATUS FOR CLARIFYING LIQUIDS

Franklin P. Lasseter, Westport, Conn., assignor to The Dorr Company, New York, N. Y., a corporation of Delaware Application April 3, 1942, Serial No. 437,468

7 Claims. (Cl. 210—55)

The general object of my invention is to provide an improved method of, and improved apratus for clarifying liquids by sedimentation and decantation. My invention is intended primarily for use in clarifying liquids containing flocculated suspensions and is well adapted for use in the clarification of sugar can juice, and in the clarification of juices and liquids from which solids are separated in the manufacture of beet sugar, but may be used for other clarifying purposes.

More specifically stated, the general object of the present invention is to provide improvements in multi-tray clarification characterized by the separate regulation of the withdrawal of clarified liquid and of thickened solids, or "mud" from each compartment, as required to regulate the rate at which liquid is fed into and clarified in the compartment, and to effect within the compartment the compression thickening of the solids separated from the liquid clarified to a density suitable for their delivery to the usual filtration or other mud treatment apparatus external to the multi-tray clarifier.

Multi-tray clarifiers constructed in accordance with the present invention may take various forms. In one form, the superposed clarifying compartments of the multi-tray clarifier are separated by dished trays connected at their peripheries to the cylindrical tank wall having their concave sides facing upwardly and formed with central apertures for the passage of a rotating hollow column. The latter supports the usual mud rake arms and other parts carried by the rotatable center shaft commonly employed in a multi-tray clarifier, and is formed with channels through which flocculated liquid passes downward to the different clarifying compartments from a flocculation cell or conditioning and feed chamber at the top of the clarifier, and is formed with other channels through which mud is withdrawn from the different clarifying compartments at volumetric rates regulated to insure the desired thickening action in each of the different compartments.

In one form of the invention, each mud channel extends upward to an overflow level which may be varied by means of an adjustable weir to thereby regulate the hydraulic pressure, and hence the density of the thickened solids, in the lower portion of the corresponding compartments. In lieu of this overflowing of mud through the mud channels, the latter may be connected to mud pumps which are regulated to control the density of the thickened solids withdrawn.

In another form of my invention, the multi-tray clarifier has its superposed compartments separated by dished trays which have their convex sides facing upwardly, and liquid to be clarified is supplied to the upper portion of each compartment adjacent its periphery, and thickened solids are withdrawn from the lower portion of each compartment at its periphery, by mud removal provisions which may include either adjustable overflow weirs or regulable mud pumps.

My invention is characterized primarily by the fact that it permits the sedimentation and decantation process to be completely carried out in each clarifying compartment of the multi-tray clarifier, and permits the efficient utilization of the entire horizontal cross-section of the compartment, both in settling impurities out of the liquid clarified, and in compressing the settling solids to the desired density. With the solids separated from the liquid in each compartment suitably thickened in that compartment, each of the different compartments of a multi-tray clarifier can be operated with equal and full efficiency. In consequence, the number of superposed clarifying compartments in a multi-tray clarifier may be appreciably greater than has been practically possible heretofore.

The novel features which characterize my invention are described with particularity in the claims annexed to and forming a part of this specification. For a better understanding of the invention, however, and its advantages and specific objects and advantages obtained with its use, reference should be had to the accompanying drawings and descriptive matter in which I have illustrated and described preferred embodiments of the invention.

Of the drawings:

Fig. 6 is a diagrammatic vertical section of a clarifier having feed inlets and mud outlets at the peripheries of its clarifying compartments;

Fig. 7 is a section on the line 7—7 of Fig. 6; and

Fig. 8 is a diagrammatic plan view, partly in section, and illustrating a modification of the construction shown in Figs. 6 and 7.

Figure 1:
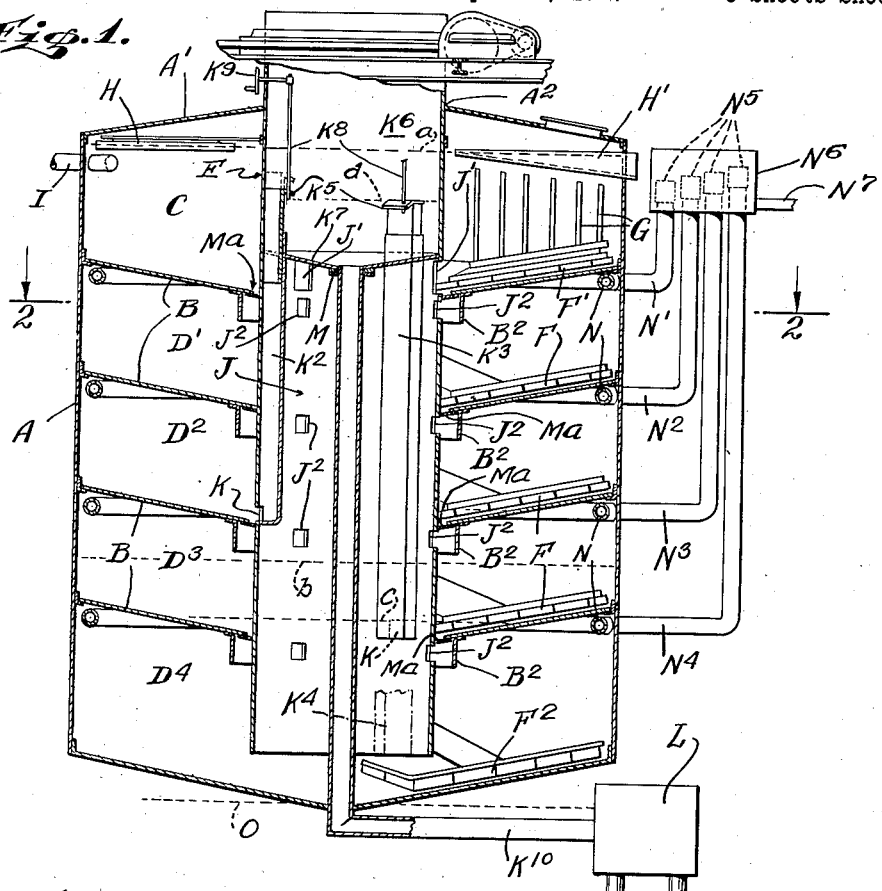
Fig. 1 is a diagrammatic vertical section of a multi-tray clarifier comprising a central rotating column formed with feed and mud channels, the section being taken on the broken line I—I of Fig. 2.
Figure 2:
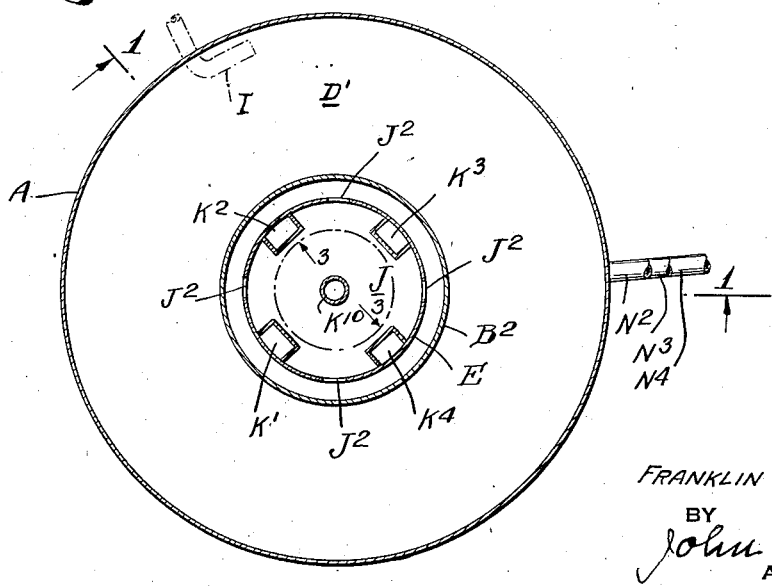
Fig. 2 is a plan section on the line 2—2 of Fig. 1.
Figure 3:
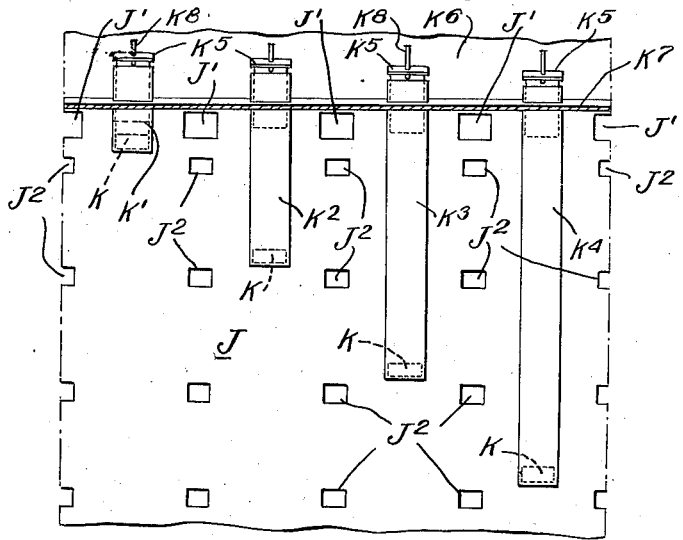
Fig. 3 is a developed section on the circular line 3—3 of Fig. 2.

Figs. 1, 2 and 3 show a multi-tray clarifier which is divided by trays or partitions B into an upper flocculation cell C and a subjacent series of superposed compartments $D^1$, $D^2$, $D^3$ and $D^4$, all of the compartments being shown as alike in form and proportion, except that the compartment $D^4$ is shown as of slightly greater vertical depth than the compartments $D^1$, $D^2$ and $D^3$. Each partition B is dished with its concave side upper-most, and is attached at its periphery to the cylindrical tank wall and is formed with a central aperture in register with an opening $A^2$ in the top wall $A^1$ of the clarifier. A vertical rotatable column E extends down through the opening $A^2$ and through the subjacent central apertures in the different partitions B. The column E is shown as supporting the usual mud rake arms F in the lower portion of the different clarifying compartments, and mud rake arms F' in the lower portion of the flocculating cell C. As shown the arms F' support uprising flocculating paddles G. As shown also the rotating column E supports a scum rake H which works floating solids and scum in the upper portion of the cell C into a scum trough H', which may be of the usual form.

Advantageously, and as shown, liquid to be clarified is passed into the flocculation cell C through a tangentially extending inlet nozzle I. The feed liquid after being suitably flocculated in the cell C passes from the latter into a feed channel J within the hollow column E, through one or more ports J' formed in the tubular body of the column E at a level immediately above the central portion of the partition B which forms the bottom wall of the cell C. The flocculated liquid passes from the channel J into each of the different clarifying compartments $D^1$, $D^2$, $D^3$ and $D^4$, through a corresponding set of ports $J^2$ formed in the tubular body of the column E. Each set of ports $J^2$ opens into the upper portion of the corresponding compartment, and to spread and reduce the velocity of the feed streams discharged through the ports $J^2$, each compartment includes an annular baffle $B^2$, which surrounds and is spaced a short distance from the column E and which defines the outer wall of an annular space into which the compartment inlet ports open. Each baffle $B^2$ depends from and is supported by the partition B directly above it. Each of said annular spaces is open at its lower edge to the corresponding clarifying compartment.

In the clarifier shown in Figs. 1, 2 and 3, thickened solids or "mud" are discharged from the lower portion of each clarifying compartment through a corresponding port K extending through the tubular body of the column E and opening into a corresponding "mud" channel, the mud channel for the compartments $D^1$, $D^2$, $D^3$ and $D^4$ being respectively designated $K^1$, $K^2$, $K^3$ and $K^4$. As shown each mud channel extends upward from the corresponding port K and is formed by welding the side edges of a vertically disposed channel bar to the inner wall of the tubular body of the column E. For the purpose of the present invention, it is essential that the mud discharged from each compartment through the corresponding outlet port or ports K should be opposed by a suitable back pressure which is subject to regulation. In the form of the invention shown in Figs. 1, 2 and 3, the desired back pressure opposing flow through each port K is maintained and regulated by providing the corresponding mud channels $K^1$, $K^2$, $K^3$ or $K^4$ with an overflow outlet at a level suitably above the corresponding port K, and subject to suitable adjustment. Thus, as shown in Figs. 1, 2 and 3 each mud channel discharges over a corresponding vertically adjustable weir $K^5$, forming an upper end portion of the mud channel, into a mud well or mud receiving space $K^6$ within the hollow column E. Each weir $K^5$ is provided with adjusting provisions including an uprising rod or stem $K^8$ and a cooperating adjusting element $K^9$ accessible for adjustment at the upper end of the column E. The space $K^6$ is above the feed channel J and is separated from the latter by a partition $K^7$ extending transversely across the hollow interior of the column E.

The mud overflowing from the different mud channels $K^1$, $K^2$, $K^3$ and $K^4$ into the mud receiving space $K^6$, passes away from the latter through a mud discharge pipe $K^{10}$ having a portion axially disposed within the column E and receiving mud at its upper end through a central opening in the partition $K^7$. The mud pipe $K^{10}$ extends down the bottom wall of the clarifying tank and comprises a laterally extending portion leading away from the clarifier to external filtration or other mud handling and treating apparatus L. For example, when two such clarifiers as are shown in Figs. 1-3 hereof, are used in the compound clarification of sugar cane juice in accordance with the process disclosed in the Petree Patent 1,625,680, of April 19, 1927, the clarifier in which the primary or rich juice is clarified may have its mud delivery pipe $K^{10}$ arranged to deliver mud into admixture with the secondary juice fed to the other clarifier, and the mud delivery pipe $K^{10}$ of the last mentioned clarifier may deliver mud to a rotary filter.

Suitable sliding seal means M, which may be of known form, are provided to prevent leakage through the joint between the upper end of the pipe $K^{10}$ and the partition $K^7$. Sliding seal means MA are provided to prevent leakage through the joint between the column E and each partition B, at the margin of the central opening in the latter. The sealing means M and MA may be of known type.

Liquid clarified in the different clarifying compartments is withdrawn from the latter through overflow piping of customary type and shown as comprising external stand pipes $N^1$, $N^2$, $N^3$ and $N^4$, respectively. From the upper end of each standpipe associated with the compartments $D^1$, $D^2$, $D^3$ and $D^4$, clarified liquid overflows into a receiving box $N^6$ at an overflow level which can be adjusted by vertically adjusting a sleeve $N^5$ in telescopic engagement with the upper end of the standpipe. The clarified liquid passes away from the box $N^6$ through a pipe $N^7$. At its lower end, each standpipe is connected to an apertured, circularly extending inlet pipe N located in the upper portion of the corresponding clarifying compartment.

The central column E may be supported for rotation, and be rotated by mechanism including a motor above the clarifier, in the manner in which the mud rake shaft of a multi-tray clarifier of the usual type is customarily mounted and rotated.

In the contemplated mode of use of the apparatus shown in Figs. 1, 2 and 3, the liquid to be clarified is passed into and suitably flocculated in the cell C and then passes from the latter to the clarifying compartments $D^1$, $D^2$, $D^3$ and $D^4$ through the ports $J'$, channel J in the column E, and ports $J^2$. The rate at which the flocculated liquid thus passes into each clarifying compartment through the corresponding ports $J^2$ is dependent both on the level at which clarified liquid overflows from the compartment into the receiving chamber $N^6$, and upon the level at which mud overflows from the compartment into the mud receiving space $K^6$, and it is possible to vary said rate by effecting a vertical adjustment of the corresponding weir $K^5$ or a vertical adjustment of the corresponding sleeve $N^5$.

However, in the normal contemplated use of the apparatus shown in Figs. 1–3, each sleeve $N^5$ is adjusted to regulate the rate at which clarified liquid overflows from the corresponding compartment, and each weir $K^5$ is adjusted only as required to regulate the mud density, i. e. the ratio of solids in the mud, discharged from the corresponding clarifying compartment. In the common operating condition in which the rate at which liquid to be clarified is passed to the clarifier varies without any corresponding variation in the solid contents of that liquid, each sleeve $N^5$ of the clarifier may well be adjusted as required to keep the rate at which clarified liquid is discharged from each compartment in constant proportion to the rate at which liquid to be clarified comes to the clarifier. In such case each weir $K^5$ may well be adjusted only as required to maintain the mud discharged from each compartment at a constant density, so that the volumetric rate of mud discharge will be kept in constant proportion to the rate of overflow of clarified liquid.

The adjustment of a weir $K^5$ regulates the density of the mud discharged from the corresponding clarifying compartment, by varying the back pressure opposing the outflow of mud from that compartment into the corresponding mud channel. When feed liquid of constant composition is being continuously supplied to a clarifying compartment, and the clarity of the clarified liquid overflowing from the compartment is constant, the rate at which solids separate from the liquid clarified in the compartment, will be in constant proportion to the rate of feed to the compartment and to the rate at which clarified liquid is discharged from the compartment, regardless of the adjustment of the corresponding weir $K^5$. Under such operating conditions, however, an increase in the elevation of the weir $K^5$ pertaining to the compartment, will directly increase the weight of the column of mud in the mud channel, and thus increases the back pressure opposing the passage of mud into said mud channel from said compartment.

The first and immediate affect of an increase in the back pressure on the mud outlet, if unattended by a change in composition of the feed liquid passing into, or of the clarified liquid passing out of the clarifying compartment, is a temporary interruption of or reduction in the mud discharge from the compartment, and a correspsonding progressive increase in the accumulation of solids in the lower compression zone of the clarifying compartment. The increase in the amount of solids accumulating in the compression zone raises the top surface of the latter, and within limits increases the density of the mud or thickened solids at the bottom of the compression zone.

Assuming no other change in operating conditions, the amount of solids in the clarifying compartment will cease to increase, and the solids thickening action of the compartment will be stabilized again as soon as the hydraulic pressure in the compartment at its mud outlet port K, is built up to the value required to move solids out of the compartment and up through its mud channel, at the rate at which solids are settling out of the liquid clarified in the compartment.

The hydraulic pressure at the outlet port K from the compartment will thus build up as a result of two factors; namely (1) the increase in the thickness or depth of the compression zone of the compartment produced by an increase in the amount of solids accumulated in said zone, and (2) the increase in the average density of the mud in the compression zone.

In the normal practice of my invention, the back pressure against which mud is discharged from each clarifying compartment is sufficient to prepare mud for delivery to filtration or other mud handling or treating apparatus L external to the clarifier so that feed liquid entering each clarifying compartment is subjected to a complete sedimentation and decantation process in that clarifying compartment.

In the practice of my invention with the apparatus illustrated in Figs. 1, 2 and 3, the dilution of the feed liquid passing from the flocculation cell C to the different clarifying compartments will be the same. The density of the feed entering any one clarifying compartment will thus be identical with the density of the feed entering each other clarifying compartment.

Furthermore, the horizontal areas of the settling zone and of the compression zone in each clarifying compartment, are each equal to the full horizontal area of the compartment. In consequence, each of the different clarifying compartments is adapted to operate with full clarifying efficiency, and the different compartments will have the same clarifying capacity if said compartments are similar in shape and dimensions. In such case the aggregate settling zone area and the aggregate compression zone area of the multi-tray clarifier will each be equal to the horizontal cross-section of a single clarifying compartment multiplied by the number of such compartments in the clarifier.

As shown, the clarifying compartments $D^1$, $D^2$, and $D^3$ are all of the same depth, while the compartment $D^4$ is made of slightly greater depth to insure it the thickening capacity required to take care of the solids settling in that compartment, and the solids received from the feed chamber J. The last mentioned solids include the relatively small amount of solids which may settle out of the feed liquid in the flocculation cell C and pass out of the latter through the ports $J'$, and the further small amount of solids which may settle out of the feed in the channel J.

Since each of the superposed clarifying compartments operates independently of the other compartments, an increase in the number of compartments of a clarifier, constructed and used in accordance with the present invention, proportionally increases the clarifying capacity of the clarifier, and the number of superposed compartments included in a single multi-tray clarifier, need be limited only by such practical conditions, as the necessity for accommodating the multiplicity of mud channels required, the clarifier head room requirements and the like.

Even though a clarifier of the type shown in Figs. 1–3 comprises appreciably more superposed clarifying compartments than has been customary heretofore, the use of the major portion of the horizontal cross-section of the column E as a feed channel J, permits that channel and its associated inlet and outlet ports $J^1$ and $J^2$ to be so proportioned and disposed, that the flocculated feed can pass from the flocculation cell C into each of the different clarifying compartments without injury to the flocculated structures, thus insuring maximum subsidence of the flocculated solids in the clarifying compartments.

The clarifier structure illustrated in Figs. 1, 2 and 3 avoids relatively large differences between the pressures at the opposite sides of joints between spaces holding fluids of different densities. In consequence, there is but little tendency for the leakage of mud from the bottom of one compartment into the liquid in the upper portion of the subjacent compartment. Furthermore, when the rate at which liquid to be clarified is passed into the clarifier, the resultant increase in the pressure at which the feed is supplied to the clarifier tends automatically to produce corresponding increases in the rates at which solids and clarified liquids are withdrawn from each compartment. It is to be understood, however, that the rate at which liquid to be clarified is fed to any clarifier compartment cannot be unduly increased without a reduction in the clarity of the liquid clarified therein and a reduction in the density of the solids discharged therefrom.

Figure 4:
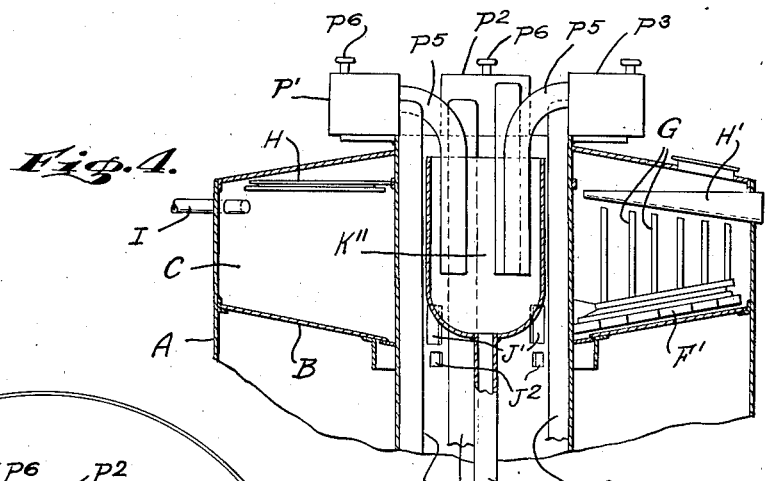
Fig. 4 is a diagrammatic vertical section, taken on the line 4—4 of Fig. 5, of the upper portion of a multi-tray clarifier having mud removing means different from those shown in Figs. 1 and 2.
Figure 5:
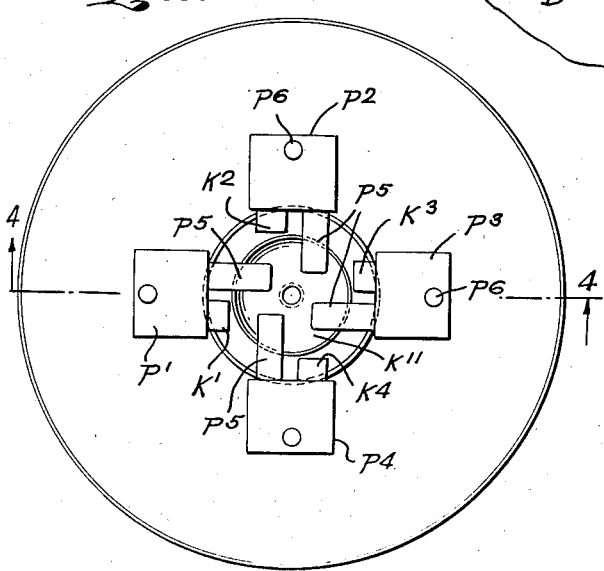
Fig. 5 is a diagrammatic plan.

In lieu of regulating the density of the muds discharged from the different clarifying compartments by regulating the height of mud overflow levels, the mud outlet of each clarifying compartment may be connected to the inlet of a mud pump individual to that compartment and regulable to control the mud pressure at its inlet. In Figs. 4 and 5, I have illustrated the use of such mud pumps in connection with a clarifier which may be identical except in its mud handling provisions, with the clarifier shown in Figs. 1–3.

The clarifier shown in Figs. 4 and 5 includes mud channels $K^1$, $K^2$, $K^3$ and $K^4$ associated at their lower ends with the different clarifying compartments as in the construction first described, but individually connected at their upper ends to the inlets of corresponding mud pumps $P^1$, $P^2$, $P^3$ and $P^4$, respectively. The mud pumps, as shown, are mounted on the central column E above the top of the clarifier tank and as shown each pump is formed with a depending outlet pipe $P^5$, which extends down into a mud receiving chamber $K^{11}$ in the form of a bowl-shaped enlargement of the upper end of the stationary mud pipe $K^{10}$. The receiving chamber $K^{11}$ is small enough in diameter to provide clearance between it and the adjacent walls of the mud channels $K^1$–$K^4$, and has its upper edge above the liquid level in the flocculating cell C. The construction shown in Figs. 4 and 5 omits the transverse partition $K^7$ and sliding seal M of the construction first described.

The mud pumps $P^1$, $P^2$, $P^3$ and $P^4$ may be of any suitable type, and in particular, each such pump may be of a known type heretofore commonly employed to remove mud from multi-tray clarifiers, and including means for adjusting its volumetric rate of discharge. The pump attachment $P^6$ forms the conventionally illustrated operating element of such adjusting means. By the adjustment of the device $P^6$ of any of the mud pumps of Figs. 4 and 5, it is thus possible to produce the same effect on the density of the mud withdrawn from the corresponding clarifying compartment, which is produced in the construction first described, by adjustment of the corresponding overflow weir $K^5$.

As previously stated the general principles of the present invention may be utilized in or in connection with apparatus quite different from that illustrated in Figs. 1–5. Thus, for example, the invention is also well adapted for use in and with a multi-tray clarifier AA of the type shown in Figs. 6 and 7, in which the superposed compartments are separated by dished trays or partitions BA, having their convex sides facing upwardly and in which the feed enters and the mud is discharged from each clarifying compartment at the periphery of the latter.

As shown in Figs. 6 and 7 the partitions BA are connected at their peripheries to a cylindrical shell Q. The latter is within, and is separated by an annular space R from the main tank wall or shell of the clarifier AA. As shown, the shell Q is mechanically connected to the tank shell by vertically disposed web members or spacing strips Q' which may have their inner and outer edges welded to the shell Q and tank body respectively. All or some of the different sections of the space R separated from one another by the members Q' may serve as feed channels, each of which is open at its upper end to the flocculation cell CA above the clarifying compartments, and is in communication with the upper portions of the different clarifying compartments through corresponding feed ports R' formed in the shell Q.

As shown, a horizontally disposed annular baffle CA', connected at its periphery to the clarifier shell, divides the flocculation cell CA into upper and lower sections in communication through the central opening in the baffle. The portion of the cell above the baffle may be provided with a tangential inlet I and scum removing provisions HA and HA' similar to the parts H and H' of the construction first described, and either or both of the sections may include suitable flocculation elements.

The latter as well as the mud scum rake arms FA and HA which are analogous to the arms F and H of the construction first described are shown as rotated by a solid vertical shaft EA which may be of relatively small diameter and passes through correspondingly small center apertures in the trays BA and in the top wall of the clarifier shell. The clarifier AA may be provided with clarified liquid overflow piping which differs from that employed in the construction first described only in that it comprises apertured inlet pipes $NA^1$ located in the upper central portion of each clarifying compartment and differing from the pipes N of the construction first described in having a shorter radius of curvature.

Mud channels $KA^1$, $KA^2$, $KA^3$, $KA^4$ and $KA^5$ respectively associated with the compartments $DA^1$, $DA^2$, $DA^3$, $DA^4$ and $DA^5$ are shown in Figs. 6 and 7. Each of said channels is connected to the corresponding clarifying compartment mud outlet KA which leads away from the lower portion of the peripheral wall of the compartment. As shown, each of the mud channels $KA^1$–$KA^5$, is in the form of an uprising pipe external to the clarifier shell and provided at its upper end with a discharge terminal or fitting, including a vertically adjustable weir KA⁶, over which mud flows from the pipe into a mud receiving chamber KA⁷. From the latter the mud passes through a discharge pipe KA⁸ to filtration or other mud receiving apparatus.

In respect to the principles of the present invention, the general operation of the apparatus shown in Figs. 6 and 7 is similar to the operation of the apparatus shown in Figs. 1–5. The adjustment of the weirs KA⁶ of Figs. 6 and 7 controls the densities of the muds discharged from the different clarifying compartments exactly as those mud densities are controlled by adjustments of the weirs K⁵ of the construction first described, or by the described adjustments of the mud pumps P¹–P⁴ of Figs. 4 and 5.

Fig. 8 illustrates a clarifier AB differing from the clarifier shown in Figs. 6 and 7 in that it has somewhat different feed and mud discharge provisions, and has its trays BA attached at their peripheries to the clarifier shell. The feed channels JB of Fig. 8 are shown as formed by vertically disposed channel bar parts external to the tank shell and having their edges welded to the latter. Each channel JB communicates at its upper end with the flocculation cell and at lower levels with each of the subjacent clarifying compartments, through ports JB' formed in the tank shell.

The mud channels KB¹, KB², KB³, KB⁴ and KB⁵ of the clarifier AB are shown as similar to the feed channel in that each is formed by welding the edges of a channel bar part to the outer side of the tank shell. The mud channels KB¹–KB⁵ may be provided with adjustable discharge weirs at their upper ends as are the mud channels of the clarifier shown in Figs. 6 and 7, but as shown in Fig. 8, the upper ends of the mud channels KB¹, KB², KB³, KB⁴ and KB⁵ are connected to the inlets of mud pumps PB¹, PB², PB³, PB⁴ and PB⁵, respectively, similar to the mud pumps PB and each of which includes discharge adjusting provisions comprising an adjusting part P⁶. As shown, each of the different mud pumps is provided with a discharge pipe PB⁶ delivering mud to a mud receiver KA⁷ of the character shown in Figs. 6 and 7.

The present invention is especially well adapted for use in the clarification of sugar cane juice, particularly because of the advantages obtainable by passing such juice directly to the different clarifying compartments by free gravitational flow from a common flocculation chamber above the compartments, and because of the relatively small density difference between the sugar cane juice, the mud and the clarified juice separated therefrom under ordinary clarification conditions.

As is well known cane sugar juice is customarily passed to the clarifier after being limed and heated to a temperature of 212°–215° F. The subsidence of the settleable solids in the clarifying compartments is expedited, and made more efficient by suitably flocculating the juice in a flocculation cell or chamber, and then passing the flocculated juice to the different clarifying compartments at a relatively low velocity and along an easy flow path, so as to avoid material disintegration of the floc structures formed in the flocculation cell. In all of the forms of the invention shown, the flow paths from the flocculation cell to the different clarifying compartments may be relatively short, simple in form, and large in cross section.

By way of illustration and example of the small density difference between unclarified sugar cane juice and the mud separated from the juice, I note that in the customary clarification of primary, or first mill juice obtained from the extensively used variety of sugar cane known as P. O. J. 2878, the specific gravity of the juice as it passes to the clarifier and to the clarifying compartments thereof, is ordinarily about 1.036, and under good normal clarification conditions, the mud withdrawn from the clarifier will have a specific gravity of about 1.048, and will usually contain from about 3 to 5 per cent of filterable solids. In such case the specific gravity of the clarified juice is approximately 1.035. The densities stated are those existing at the temperature range of 206°–210° F.

With such a small density difference between the juice to be clarified and the mud separated therefrom, the maintenance of the back pressure on the mud outlets of the different clarifying compartments of a multi-tray clarifier necessary to the production of mud of the desired density, presents a special problem for which such an uprising mud overflow channel arrangement, as is shown in Figs. 1–3, and in Figs. 6 and 7, constitutes a simple, effective and relatively inexpensive solution. A better understanding of the nature of that problem, and of the special advantages of the uprising mud overflow channel arrangements devised by me, may be facilitated by the following explanation:

In a clarifier of the general type shown in Fig. 1, and suitably designed for use in accordance with the present invention, the vertical dimension or depth of each of the clarifying compartments $D^1$, $D^2$ and $D^3$ may well be approximately 30 inches, and the depths of the flocculation cells C and of the lower compartment $D^4$ may be proportioned to the depths of the compartments $D^1$, $D^2$ and $D^3$ as indicated in Fig. 1. The symbols $a$, $b$, $c$ and $d$ are assumed to represent the elevations above a subjacent datum level line $o$ of certain levels, respectively designated by those symbols in Fig. 1, namely: $a$ represents the elevation of the liquid level in the flocculation cell C; $b$ represents the level at which the liquid in the compartment $D^3$ has the same specific gravity as the unclarified liquid; $c$ represents the elevation of the top of the mud outlet K from the compartment $D^3$; and $d$ represents the elevation of the overflow level for the mud channel $K^3$.

On the assumption that the level $d$ is that of the upper end of a stationary column within the mud channel $K^3$ of mud having a specific gravity 1.048, and of sufficient height to balance the hydrostatic pressure of the mud in the compartment $D^3$ at the level $c$, and on the further assumption that the specific gravity of the fluid in the compartment $D^3$ below the level $b$ increases in direct proportion with the distance from that level, from 1.036 to 1.048, the distance between the level $d$ and $c$ can be determined from the following equation:

$$1.036(a-b) + \frac{(1.036+1.048)}{2}(b-c) = 1.048(d-c)$$

In a clarifier having the vertical dimensions assumed above, the distance between the levels $a$ and $c$ may be approximately 121 inches, and the average elevation of the level $b$ above the level $c$ may, and is assumed herein to be 17 inches. On the foregoing assumption, it thus appears that the height of the mud column in the channel $K^3$ extending between the levels $d$ and $c$ will be approximately 119.7 inches.

This means that under normal operating conditions, a total interruption of the discharge of mud through the channel $K^3$ by adjustment of the corresponding weir $K^5$, requires that the overflow edge of the latter be raised to a level about 1.3 below the liquid level in the flocculation cell C. In normal operation the distance between the levels $a$ and $d$ must be several inches greater than the above calculated distance of 1.3 inches to provide the hydraulic head required to maintain the proper mud velocity in the channel $K^3$ and to overcome the frictional resistance to the mud flow into and through that channel.

As is indicated in the drawings, the normal overflow levels for the different mud channels $K^1$, $K^2$, $K^3$ and $K^4$ will be progressively increasing distances below the liquid level in the cell C, in consequence of the fact that the columns of mud in those channels are of progressively increasing lengths. However, those distances are relatively small, since in a clarifier having the vertical dimensions assumed above for the clarifier shown in Fig. 1, the overflow level of the longest channel $K^4$ may well be not more than about one foot below the liquid level in the feed chamber C, and the height of the mud columns overflowing through the channels $K^1$-$K^4$ will vary from about five feet in the case of the mud channel $K^1$, to more than twelve feet in the case of the channel $K^4$. Although the effective length of the mud channel $K^4$ thus exceeds the effective length of the mud channel $K^1$ by more than seven feet the upper ends of all the mud channels are on levels sufficiently close to one another for the convenient reception of the mud overflowing from the different channels by a common mud receiving and discharging means.

While with individual mud discharge pumps for the different compartments, as illustrated in Figs. 4 and 5 and in Fig. 8, the same back pressures at the mud outlets from the different compartments may be maintained as with the uprising mud overflow channels of Figs. 1–3 and Figs. 6 and 7, the installation and maintenance costs will ordinarily be higher with the pump arrangement than with the mud overflow channel arrangement.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent, is:

1. In the process of clarifying liquid by the sedimentation and decantation process in superposed clarifying compartments, the method which consists in feeding the liquid into the different compartments by gravitational flow from a common source, overflowing clarified liquid from the upper portion of each compartment and discharging from the lower portion of each compartment a stream of mud individual to that compartment and including the solids separated from the liquid in said compartment against an opposing back pressure large enough for the completion of said process of clarifying the liquid fed into each compartment within that compartment.

2. In the process of clarifying liquid by the sedimentation and decantation process in superposed clarifying compartments, the method which consists in feeding the liquid into each compartment by gravitational flow along a liquid filled path from a common source for and above the different compartments, overflowing clarified liquid from the upper portion of each compartment and discharging mud including the solids separated from the liquid in said compartment through a lower outlet therefrom in an upwardly moving stream individual to that compartment and creating a back pressure at said outlet substantially equal to the head of the liquid passing to said compartment from said source through said compartment and path.

3. In the process of clarifying liquid by the sedimentation and decantation process in superposed clarifying compartments, the method which consists in feeding the liquid into each compartment by gravitational flow along a liquid filled path from a common source for and above the different compartments, overflowing clarified liquid from the upper portion of each compartment and discharging mud including the solids separated from the liquid in said compartment through a lower outlet therefrom in a stream individual to said compartment and moving upward to an overflow level and relatively adjusting the elevations of the different overflow levels to thereby regulate the relative densities of the muds discharged through the outlets of the different compartments.

4. In the process of clarifying liquid by the sedimentation and decantation process in superposed clarifying compartments, the method which consists in feeding the liquid into the different compartments by gravitational flow from a common source, overflowing clarified liquid from the upper portion of each compartment and discharging mud including the solids separated from the liquid in each compartment through a lower outlet therefrom in a stream individual to each compartment and moving upward to an overflow level high enough to create a back pressure at said outlet substantially equal to the head of the liquid passing to said outlet from said source.

5. In a multi-tray clarifier, the combination with a plurality of superposed clarifying compartments each having a mud outlet adjacent its bottom, means for withdrawing clarified liquid at a regulable rate from the upper portion of each compartment, a feed chamber above said compartments, feed distribution means providing a path for free gravitational flow of liquid from said chamber directly to each of the different compartments at a rate corresponding to the sum of the rate at which clarified liquid is withdrawn from the compartment and the rate at which mud passes out of the compartment through its mud outlet, and means for separately regulating the density of the mud passing out of each compartment through its outlet by maintaining a separately regulable back pressure at said outlet which opposes the outflow of mud through the outlet and is independent of the density and rate of outflow of the mud passing out of each of the other compartments.

6. In a multi-tray clarifier, the combination with a plurality of superposed clarifying compartments each having a mud outlet adjacent its bottom, means for withdrawing clarified liquid at a regulable rate from the upper portion of each compartment, a feed chamber above said compartments, feed distribution means providing a path for free gravitational flow of liquid from said chamber directly to each of the different compartments at a rate corresponding to the sum of the rate at which clarified liquid is withdrawn from the compartment and the rate at which mud passes out of the compartment through its mud outlet, and a separate mud pump connected to the mud outlet of each compartment and including means for adjusting its volumetric rate of discharge.

7. In a multi-tray clarifier, the combination with a plurality of superposed clarifying compartments each having a mud outlet adjacent its bottom, means for withdrawing clarified liquid at a regulable rate from the upper portion of each compartment, a feed chamber above said compartments, feed distribution means providing a path for free gravitational flow of liquid from said chamber directly to each of the different compartments at a rate corresponding to the sum of the rate at which clarified liquid is withdrawn from the compartment and the rate at which mud passes out of the compartment through its mud outlet, a separate mud overflow channel connected to and extending upwardly from each of said mud outlets, and means associated with each channel for regulating the level at which mud can overflow from the channel.

FRANKLIN P. LASSETER.